(12) United States Patent
Tanguay et al.

(10) Patent No.: US 8,770,294 B2
(45) Date of Patent: Jul. 8, 2014

(54) PROPPANT HAVING A POLYAMIDE IMIDE COATING

(75) Inventors: Christopher Tanguay, Trenton, MI (US); Rajesh Kumar, Riverview, MI (US)

(73) Assignee: BASF SE, Ludwigshafen (DE)

( * ) Notice: Subject to any disclaimer, the term of this patent is extended or adjusted under 35 U.S.C. 154(b) by 380 days.

(21) Appl. No.: 13/186,942

(22) Filed: Jul. 20, 2011

(65) Prior Publication Data

US 2012/0018162 A1 Jan. 26, 2012

Related U.S. Application Data

(60) Provisional application No. 61/366,281, filed on Jul. 21, 2010.

(51) Int. Cl.
*E21B 43/26* (2006.01)

(52) U.S. Cl.
USPC .............. 166/308.3; 166/280.2; 428/403; 428/407; 264/3.1; 264/129

(58) Field of Classification Search
USPC ......... 166/280.1, 280.2, 308.3; 428/428, 407; 264/3.1, 129
See application file for complete search history.

(56) References Cited

U.S. PATENT DOCUMENTS

| | | | |
|---|---|---|---|
| 3,541,038 A | | 11/1970 | Nakano et al. |
| 3,625,911 A | | 12/1971 | Redman et al. |
| 3,817,926 A | | 6/1974 | Pauze et al. |
| 3,843,587 A | | 10/1974 | Keating et al. |
| 4,447,589 A | | 5/1984 | Nishizawa et al. |
| 4,579,667 A | | 4/1986 | Echt et al. |
| 4,733,729 A | * | 3/1988 | Copeland .............. 166/276 |
| 4,740,576 A | | 4/1988 | Reiter et al. |
| 5,188,764 A | * | 2/1993 | Shimizu et al. ............ 516/31 |
| 5,924,488 A | | 7/1999 | Nguyen et al. |
| 6,632,527 B1 | | 10/2003 | McDaniel et al. |
| 7,255,169 B2 | | 8/2007 | van Batenburg et al. |
| 7,270,879 B2 | | 9/2007 | McCrary |
| 7,281,580 B2 | | 10/2007 | Parker et al. |
| 7,334,635 B2 | | 2/2008 | Nguyen |
| 7,571,767 B2 | | 8/2009 | Parker et al. |
| 2005/0267001 A1 | | 12/2005 | Weaver et al. |
| 2006/0078682 A1 | * | 4/2006 | McDaniel et al. ......... 427/372.2 |
| 2007/0093602 A1 | * | 4/2007 | Thompson-Colon et al. .............. 525/127 |
| 2009/0151944 A1 | * | 6/2009 | Fuller et al. ............. 166/280.2 |

FOREIGN PATENT DOCUMENTS

| | | |
|---|---|---|
| CN | 101397477 B | 12/2010 |
| EP | 0017422 A1 | 10/1980 |
| EP | 1717820 A1 | 11/2006 |
| JP | H11263840 A | 9/1999 |
| WO | WO2007054543 A1 | 5/2007 |
| WO | WO 2007/078995 A1 | 7/2007 |

OTHER PUBLICATIONS

L.C.J. Hesselmans et al., "Polycarbodiimide crosslinkers", Progress in Organic Coatings 55 (2006), pp. 142-148.
Solvay Advanced Polymers, "Torlon Polyamide-imide Design Guide", 2003. Aplpharetta, GA, USA; pp. 1-45.
English language abstract of CN101397477B extracted from espacenet.com on Apr. 21, 2014, 9 pages.
English language abstract of JPH11263840 extracted from espacenet.com on Apr. 21, 2014, 8 pages.
International Search Report for PCT/EP2011/062438, mailed Oct. 26, 2011, 4 pages.

* cited by examiner

*Primary Examiner* — Zakiya W Bates
*Assistant Examiner* — Silvana Runyan
(74) *Attorney, Agent, or Firm* — Howard & Howard Attorneys PLLC

(57) ABSTRACT

A proppant comprises a particle and a polyamide imide coating disposed on the particle. A method of forming the proppant comprises the steps of providing the particle, providing the polyamide imide coating, and coating the particle with the polyamide imide coating.

30 Claims, No Drawings

PROPPANT HAVING A POLYAMIDE IMIDE COATING

RELATED APPLICATION

This application claims priority to U.S. Ser. No. 61/366,281, filed on Jul. 21, 2010.

FIELD OF THE INVENTION

The subject invention generally relates to a proppant and a method of forming the proppant. More specifically, the subject invention relates to a proppant which comprises a particle and a coating disposed on the particle, and which is used during hydraulic fracturing of a subterranean formation.

DESCRIPTION OF THE RELATED ART

Domestic energy needs in the United States currently outpace readily accessible energy resources, which has forced an increasing dependence on foreign petroleum fuels, such as oil and gas. At the same time, existing United States energy resources are significantly underutilized, in part due to inefficient oil and gas procurement methods and a deterioration in the quality of raw materials such as unrefined petroleum fuels.

Petroleum fuels are typically procured from subsurface reservoirs via a wellbore. Petroleum fuels are currently procured from low-permeability reservoirs through hydraulic fracturing of subterranean formations, such as bodies of rock having varying degrees of porosity and permeability. Hydraulic fracturing enhances production by creating fractures that emanate from the subsurface reservoir or wellbore, and provides increased flow channels for petroleum fuels. During hydraulic fracturing, specially-engineered carrier fluids are pumped at high pressure and velocity into the subsurface reservoir to cause fractures in the subterranean formations. A propping agent, i.e., a proppant, is mixed with the carrier fluids to keep the fractures open when hydraulic fracturing is complete. The proppant typically comprises a particle and a coating disposed on the particle. The proppant remains in place in the fractures once the high pressure is removed, and thereby props open the fractures to enhance petroleum fuel flow into the wellbore. Consequently, the proppant increases procurement of petroleum fuel by creating a high-permeability, supported channel through which the petroleum fuel can flow.

However, many existing proppants exhibit inadequate thermal stability for high temperature and pressure applications, e.g. wellbores and subsurface reservoirs having temperatures greater than 70° F. and pressures, i.e., closure stresses, greater than 7,500 psi. As an example of a high temperature application, certain wellbores and subsurface reservoirs throughout the world have temperatures of about 375° F. and 540° F. As an example of a high pressure application, certain wellbores and subsurface reservoirs throughout the world have closure stresses that exceed 12,000 or even 14,000 psi. As such, many existing proppants, which comprise coatings, such as epoxy or phenolic coatings, which melt, degrade, and/or shear off the particle in an uncontrolled manner when exposed to such high temperatures and pressures. Also, many existing proppants do not include active agents, such as microorganisms and catalysts, to improve the quality of the petroleum fuel recovered from the subsurface reservoir.

Further, many existing proppants comprise coatings having inadequate crush resistance. That is, many existing proppants comprise non-uniform coatings that include defects, such as gaps or indentations, which contribute to premature breakdown and/or failure of the coating. Since the coating typically provides a cushioning effect for the proppant and evenly distributes high pressures around the proppant, premature breakdown and/or failure of the coating undermines the crush resistance of the proppant. Crushed proppants cannot effectively prop open fractures and often contribute to impurities in unrefined petroleum fuels in the form of dust particles.

Moreover, many existing proppants also exhibit unpredictable consolidation patterns and suffer from inadequate permeability in wellbores, i.e., the extent to which the proppant allows the flow of petroleum fuels. That is, many existing proppants have a lower permeability and impede petroleum fuel flow. Further, many existing proppants consolidate into aggregated, near-solid, non-permeable proppant packs and prevent adequate flow and procurement of petroleum fuels from subsurface reservoirs.

Also, many existing proppants are not compatible with low-viscosity carrier fluids having viscosities of less than about 3,000 cps at 80° C. Low-viscosity carrier fluids are typically pumped into wellbores at higher pressures than high-viscosity carrier fluids to ensure proper fracturing of the subterranean formation. Consequently, many existing coatings fail mechanically, i.e., shear off the particle, when exposed to high pressures or react chemically with low-viscosity carrier fluids and degrade.

Finally, many existing proppants are coated via noneconomical coating processes and therefore contribute to increased production costs. That is, many existing proppants require multiple layers of coatings, which results in time-consuming and expensive coating processes.

Due to the inadequacies of existing proppants, there remains an opportunity to provide an improved proppant.

SUMMARY OF THE INVENTION AND ADVANTAGES

The subject invention provides a proppant for hydraulically fracturing a subterranean formation. The subject invention also provides a method of forming the proppant comprising a particle and a polyamide imide coating disposed on the particle. The method comprises the steps of providing the particle, providing the polyamide imide coating, and coating the particle with the polyamide imide coating. A method of hydraulically fracturing a subterranean formation is also provided.

Advantageously, the proppant of the subject invention improves upon the performance of existing proppants. The performance of the proppant is attributable to the polyamide imide coating. In addition, the proppant of the subject invention is formed efficiently, requiring few resources.

DETAILED DESCRIPTION OF THE INVENTION

The subject invention includes a proppant, a method of forming, or preparing, the proppant, a method of hydraulically fracturing a subterranean formation, and a method of filtering a fluid. The proppant is typically used, in conjunction with a carrier fluid, to hydraulically fracture the subterranean formation which defines a subsurface reservoir (e.g. a wellbore or reservoir itself). Here, the proppant props open the fractures in the subterranean formation after the hydraulic fracturing. In one embodiment, the proppant may also be used to filter unrefined petroleum fuels, e.g. crude oil, in fractures to improve feedstock quality for refineries. However, it is to be appreciated that the proppant of the subject invention can also have applications beyond hydraulic fracturing and crude oil filtration, including, but not limited to, water filtration and artificial turf.

The proppant comprises a particle and a polyamide imide coating disposed on the particle. As used herein, the terminology "disposed on" encompasses the polyamide imide coating being disposed about the particle and also encompasses both partial and complete covering of the particle by the polyamide imide coating. The polyamide imide coating is disposed on the particle to an extent sufficient to change the properties of the particle, e.g., to form a particle having a polyamide imide coating thereon which can be effectively used as a proppant. As such, any given sample of the proppant typically includes particles having the polyamide imide coating disposed theron, and the polyamide imide coating is typically disposed on a large enough surface area of each individual particle so that the sample of the proppant can effectively prop open fractures in the subterranean formation during and after the hydraulic fracturing, filter crude oil, etc. The polyamide imide coating is described additionally below.

Although the particle may be of any size, the particle typically has a particle size distribution of from 10 to 100 mesh, more typically 20 to 70 mesh, as measured in accordance with standard sizing techniques using the United States Sieve Series. That is, the particle typically has a particle size of from 149 to 2,000, more typically of from 210 to 841, μm. Particles having such particle sizes allow less polyamide imide coating to be used, allow the polyamide imide coating to be applied to the particle at a lower viscosity, and allow the polyamide imide coating to be disposed on the particle with increased uniformity and completeness as compared to particles having other particle sizes.

Although the shape of the particle is not critical, particles having a spherical shape typically impart a smaller increase in viscosity to a hydraulic fracturing composition than particles having other shapes, as set forth in more detail below. The hydraulic fracturing composition is a mixture comprising the carrier fluid and the proppant. Typically, the particle is either round or roughly spherical.

The particle typically contains less than 1 part by weight of moisture, based on 100 parts by weight of the particle. Particles containing higher than 1 part by weight of moisture typically interfere with sizing techniques and prevent uniform polyamide imide coating of the particle.

Suitable particles for purposes of the subject invention include any known particle for use during hydraulic fracturing, water filtration, or artificial turf preparation. Non-limiting examples of suitable particles include minerals, ceramics such as sintered ceramic particles, sands, nut shells, gravels, mine tailings, coal ashes, rocks, smelter slag, diatomaceous earth, crushed charcoals, micas, sawdust, wood chips, resinous particles, polymeric particles, and combinations thereof. It is to be appreciated that other particles not recited herein may also be suitable for the purposes of the subject invention.

Sand is a preferred particle and when applied in this technology is commonly referred to as frac, or fracturing, sand. Examples of suitable sands include, but are not limited to, Arizona sand, Wisconsin sand, Badger sand, Brady sand, and Ottawa sand. Based on cost and availability, inorganic materials such as sand and sintered ceramic particles are typically favored for applications not requiring filtration.

A specific example of a sand that is suitable as a particle for the purposes of the subject invention is Arizona sand. Arizona sand is commercially available from BASF Corporation of Florham Park, N.J. Arizona sand is a natural grain that is derived from weathering and erosion of preexisting rocks. As such, this sand is typically coarse and is roughly spherical.

Another specific example of a sand that is suitable as a particle for the purposes of this invention is Ottawa sand, commercially available from U.S. Silica Company of Berkeley Springs, W. Va. Yet another specific example of a sand that is suitable as a particle for the purposes of this invention is Badger sand, commercially available from Badger Mining Corporation of Berlin, Wis. Particularly preferred sands for application in this invention are Ottawa and Badger sands. Ottawa and Badger sands of various sizes, such as 30/50, 20/40, 40/70, and 140/70 can be used.

Specific examples of suitable sintered ceramic particles include, but are not limited to, aluminum oxide, silica, bauxite, and combinations thereof. The sintered ceramic particle may also include clay-like binders.

An active agent may also be included in the particle. In this context, suitable active agents include, but are not limited to, organic compounds, microorganisms, and catalysts. Specific examples of microorganisms include, but are not limited to, anaerobic microorganisms, aerobic microorganisms, and combinations thereof. A suitable microorganism for the purposes of the subject invention is commercially available from LUCA Technologies of Golden, Colo. Specific examples of suitable catalysts include fluid catalytic cracking catalysts, hydroprocessing catalysts, and combinations thereof. Fluid catalytic cracking catalysts are typically selected for applications requiring petroleum gas and/or gasoline production from crude oil. Hydroprocessing catalysts are typically selected for applications requiring gasoline and/or kerosene production from crude oil. It is also to be appreciated that other catalysts, organic or inorganic, not recited herein may also be suitable for the purposes of the subject invention.

Such additional active agents are typically favored for applications requiring filtration. As one example, sands and sintered ceramic particles are typically useful as a particle for support and propping open fractures in the subterranean formation which defines the subsurface reservoir, and, as an active agent, microorganisms and catalysts are typically useful for removing impurities from crude oil or water. Therefore, a combination of sands/sintered ceramic particles and microorganisms/catalysts as active agents are particularly preferred for crude oil or water filtration.

Suitable particles for purposes of the present invention may even be formed from resins and polymers. Specific examples of resins and polymers for the particle include, but are not limited to, polyurethanes, polycarbodiimides, polyureas, acrylics, polyvinylpyrrolidones, acrrylonitrile-butadiene styrenes, polystyrenes, polyvinyl chlorides, fluoroplastics, polysulfides, nylon, polyamide imides and combinations thereof.

As indicated above, the proppant includes the polyamide imide coating disposed on the particle. The polyamide imide coating is selected based on the desired properties and expected operating conditions of the proppant. The polyamide imide coating may provide the particle with protection from operating temperatures and pressures in the subterranean formation and/or subsurface reservoir. Further, the polyamide imide coating may protect the particle against closure stresses exerted by the subterranean formation. The polyamide imide coating may also protect the particle from ambient conditions and minimizes disintegration and/or dusting of the particle. In some embodiments, the polyamide imide coating may also provide the proppant with desired chemical reactivity and/or filtration capability.

The polyamide imide coating comprises the reaction product of an isocyanate and an isocyanate-reactive component. More specifically, the polyamide amide coating typically comprises the reaction product of the isocyanate and the isocyanate-reactive component that comprises a carboxylic acid anhydride, as described additionally below. The isocyanate is typically selected such that the physical properties of the polyamide imide coating, such as hardness, strength, toughness, creep, and brittleness are optimized.

The isocyanate may be any type of isocyanate known to those skilled in the art. The isocyanate may be a polyisocyanate having two or more functional groups, e.g. two or more NCO functional groups. Suitable isocyanates for purposes of the present invention include, but are not limited to, aliphatic and aromatic isocyanates. In various embodiments, the isocyanate is selected from the group of diphenylmethane diisocyanates (MDIs), polymeric diphenylmethane diisocyanates (pMDIs), toluene diisocyanates (TDIs), hexamethylene diisocyanates (HDIs), isophorone diisocyanates (IPDIs), and combinations thereof.

The isocyanate may be an isocyanate prepolymer. The isocyanate prepolymer is typically a reaction product of an isocyanate and a polyol and/or a polyamine. The isocyanate used in the prepolymer can be any isocyanate as described above. The polyol used to form the prepolymer is typically selected from the group of ethylene glycol, diethylene glycol, propylene glycol, dipropylene glycol, butane diol, glycerol, trimethylolpropane, triethanolamine, pentaerythritol, sorbitol, biopolyols, and combinations thereof. The polyamine used to form the prepolymer is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

Specific isocyanates that may be used to prepare the polyamide imide coating include, but are not limited to, toluylene diisocyanate; 4,4'-diphenylmethane diisocyanate; m-phenylene diisocyanate; 1,5-naphthalene diisocyanate; 4-chloro-1; 3-phenylene diisocyanate; tetramethylene diisocyanate; hexamethylene diisocyanate; 1,4-dicyclohexyl diisocyanate; 1,4-cyclohexyl diisocyanate, 2,4,6-toluylene triisocyanate, 1,3-diisopropylphenylene-2,4-diisocyanate; 1-methyl-3,5-diethylphenylene-2,4-diisocyanate; 1,3,5-triethylphenylene-2,4-diisocyanate; 1,3,5-triisoproply-phenylene-2,4-diisocyanate; 3,3'-diethyl-bisphenyl-4,4'-diisocyanate; 3,5,3',5'-tetraethyl-diphenylmethane-4,4'-diisocyanate; 3,5,3',5'-tetraisopropyldiphenylmethane-4,4'-diisocyanate; 1-ethyl-4-ethoxy-phenyl-2,5-diisocyanate; 1,3,5-triethyl benzene-2,4,6-triisocyanate; 1-ethyl-3,5-diisopropyl benzene-2,4,6-triisocyanate and 1,3,5-triisopropyl benzene-2,4,6-triisocyanate. Other suitable polyamide imide coatings can also be prepared from aromatic diisocyanates or isocyanates having one or two aryl, alkyl, arakyl or alkoxy substituents wherein at least one of these substituents has at least two carbon atoms. Specific examples of suitable isocyanates include LUPRANATE® L5120, LUPRANATE® M, LUPRANATE® ME, LUPRANATE® MI, LUPRANATE® M20, and LUPRANATE® M70, all commercially available from BASF Corporation of Florham Park, N.J.

In a particularly preferred embodiment, the isocyanate is a polymeric isocyanate, such as LUPRANATE® M20. LUPRANATE® M20 comprises polymeric diphenylmethane diisocyanate and has an NCO content of about 31.5 weight percent.

Typically, the amount of isocyanate which is reacted with the isocyanate-reactive component to form the polyamide imide coating is from about 0.01 to about 14, typically from about 0.05 to about 10 and more typically from about 0.1 to about 3.5, percent by weight, based on 100 parts by weight of the proppant. Of course, the amount of isocyanate which is reacted with the isocyanate-reactive component to form the polyamide imide coating may vary outside of the ranges above, but is typically both whole and fractional values within about 0.01 to about 14 percent by weight, based on 100 parts by weight of the proppant.

As described above, the isocyanate is reacted with the isocyanate-reactive component. Typically, the isocyanate-reactive component comprises the carboxylic acid anhydride. The isocyanate-reactive component can comprise one or more carboxylic acid anhydrides. In a preferred embodiment the isocyanate-reactive component comprises an aromatic carboxylic acid anhydride. Suitable aromatic carboxylic acid anhydrides include, but are not limited to, trimellitic anhydride and pyromellitic dianhydride. In one embodiment, the aromatic carboxylic acid anhydride is pyromellitic dianhydride. In another embodiment, the aromatic carboxylic acid anhydride is a mixture of pyromellitic dianhydride and trimellitic anhydride. Typically, the aromatic carboxylic acid anhydride is trimellitic anhydride. The carboxylic acid anhydride may be reacted, to form the polyamide imide coating, in an amount of from about 0.06 to about 14, typically from about 0.08 to about 10, and more typically from about 0.1 to about 8, percent by weight, based on 100 parts by weight of the proppant. Of course, the amount of carboxylic acid anhydride reacted with the isocyanate to form the polyamide imide coating may vary outside of the ranges above, but is typically both whole and fractional values within about 0.06 to about 14 percent by weight, based on 100 parts by weight of the proppant.

The isocyanate-reactive component can comprise the reaction product of the carboxylic acid anhydride and an amine. Typically, the amine is selected from the group of polyether amines, amino silanes, and combinations thereof. An amino functional group of the amine typically reacts with an anhydride functional group of the carboxylic acid anhydride to form an imide linkage. The amine is commonly referred to in the art as a compatibilizer, a flexiblizer, an adhesion promoter, a coupling agent, and/or a resin additive to improve various performance properties of the polyamide imide coating, such as reduction of brittleness. Typically, the amine is reacted, to form the polyamide imide coating, in an amount of from about 0.001 to about 5, typically from about 0.01 to about 2, and more typically from about 0.05 to about 1, percent by weight, based on 100 parts by weight of the proppant. Of course, the amount of amine reacted to form the polyamide imide coating may vary outside of the ranges above, but is typically both whole and fractional values within about 0.001 to about 5 percent by weight, based on 100 parts by weight of the proppant.

The polyether amine of the present invention chemically reacts with the carboxylic acid anhydride. More specifically, the amino functional group of the polyether amine reacts with the anhydride functional group of the carboxylic acid anhydride to form a reaction product having an imide linkage as well as polyether functionality. In turn, the reaction product is further chemically reacted with the isocyanate to form the polyamide imide coating having polyether functionality.

Typically, the polyether amine includes the amino functional group attached to a polyether backbone. The polyether backbone is formed from an alkylene oxide such as ethylene oxide, propylene oxide, and/or butylene oxide. The polyether amine can be a mono amine, a diamine, and/or a triamine. The amino functional group can be primary, secondary, or tertiary. A specific example of a suitable polyether amine is JEFFAMINE® D-400, i.e., polyoxypropylenediamine, commercially available from Huntsman of The Woodlands, Tex. JEFFAMINE® D-400 is a diamine. More specifically, JEFFAMINE®

D-400 is a polyether backbone having two primary amino functional groups bonded thereto. JEFFAMINE® D-400 has a molecular weight of about 430.

The amino silane of the present invention chemically reacts with the carboxylic acid anhydride. More specifically, the amino functional group of the amino silane reacts with the anhydride functional group of the carboxylic acid anhydride to form a reaction product having an imide linkage and silane functionality. In turn, the reaction product is further chemically reacted with the isocyanate to form the polyamide imide coating having silane functionality. The silane functionality improves the chemical bonding of the polyamide imide coating to the particle.

Examples of suitable amino silanes include, but are not limited to, gamma-aminopropyltriethoxysilane, gamma-aminopropylsilsesquioxane, modified aminoorganosilane, gamma-aminopropyltrimethoxysilane, N-beta-(aminoethyl)-gamma-aminopropyltrimethoxysilane, triamino functional silane, bis-(gamma-trimethoxysilylpropyl)amine, polyazamide silane, delta-aminoneohexyltrimethoxysilane, N-beta-(aminoethyl)-gamma-aminopropylmethyldimethoxysilane, delta-aminoneohexylmethyldimethoxysilane, N-phenyl-gamma-aminopropyltrimethoxysilane, and combinations thereof. Specific examples of suitable amino silanes include, but are not limited to, Silquest™ A1100, Silquest™ 1106, Silquest™ A1108, Silquest™ A1110, Silquest™ A1120, Silquest™ A1130, Silquest™ A1170, Silquest™ A1387, Silquest™ A1637, Silquest™ A2120, Silquest™ A2639, and Silquest™ Y9669, all commercially available from Momentive Performance Materials of Albany, N.Y. A particularly suitable amino silane is Silquest™ A1100, i.e., gamma-aminopropyltriethoxysilane. Another particularly suitable amino silane is Silquest™ A1120, i.e., N-beta-(aminoethyl)-gamma-aminopropyltrimethoxysilane.

The isocyanate-reactive component may also include a catalyst. The catalyst may be used to catalyze the reaction between the carboxylic acid anhydride, the isocyanate, and/or the amine. For example, the catalyst may be used to reduce the temperature at which the carboxylic acid anhydride and the isocyanate chemically react. The isocyanate-reactive component may optionally include more than one catalyst. The catalyst may include any suitable catalyst or mixtures of catalysts known in the art. Suitable catalysts for purposes of the present invention typically include catalytic amines, such as primary, secondary, and tertiary, cyclic and acyclic catalytic amines. A specific example of a suitable catalyst is triethylamine, a tertiary amine, commercially available from BASF Corporation of Florham Park, N.J. The catalyst may be present in the proppant in any amount sufficient to catalyze the reaction between the carboxylic acid anhydride, the isocyanate, and/or the amine. The catalyst is typically present in the proppant in an amount of from about 0.0001 to about 10, more typically from about 0.0015 to about 5, and most typically from about 0.001 to about 2, percent by weight, based on 100 parts by weight of the proppant. Of course, the amount of catalyst present in the proppant may vary outside of the ranges above, but is typically both whole and fractional values within about 0.0001 to about 10 percent by weight, based on 100 parts by weight of the proppant.

The isocyanate-reactive component may further include additives. Suitable additives include, but are not limited to, surfactants, blowing agents, wetting agents, blocking agents, dyes, pigments, diluents, solvents, specialized functional additives such as antioxidants, ultraviolet stabilizers, biocides, adhesion promoters, antistatic agents, fire retardants, fragrances, and combinations of the group. For example, a pigment allows the polyamide imide coating to be visually evaluated for thickness and integrity and can provide various marketing advantages. Also, physical blowing agents and chemical blowing agents are typically selected for polyamide imide coatings requiring foaming. That is, in one embodiment, the coating may comprise a foam coating disposed on the particle. Again, it is to be understood that the terminology "disposed on" encompasses both partial and complete covering of the particle by the polyamide imide coating, a foam coating in this instance. The foam coating is typically useful for applications requiring enhanced contact between the proppant and crude oil. That is, the foam coating typically defines microchannels and increases a surface area for contact between crude oil and the catalyst and/or microorganism.

As described above, the polyamide imide coating comprises the reaction product of the isocyanate and the isocyanate-reactive component comprising the carboxylic acid anhydride. More specifically, the polyamide imide coating is a polymer comprising amide linkages and imide linkages. The amide linkages are typically formed from a chemical reaction of the isocyanate and a carboxylic acid functional group of the carboxylic acid anhydride. The imide linkages are typically formed from a chemical reaction of the isocyanate and an anhydride functional group of the carboxylic acid anhydride. However, it is to be understood that the amide linkages and the imide linkages of the polyamide imide coating can be formed from other reactants and other chemical reactions. Typically, the polyamide imide coating has, as the name suggests, a positive synergy of properties from both the amide and imide linkages, such as durability, strength, melt processability, exceptional high heat capability, and broad chemical resistance.

The polyamide imide coating is typically selected for applications requiring excellent coating stability and adhesion to the particle. Further, polyamide imide coating is typically selected based on the desired properties and expected operating conditions of a particular application. As one example, the polyamide imide coating is particularly applicable when the proppant is exposed to significant compression and/or shear forces, and temperatures exceeding 500° C. in the subterranean formation and/or subsurface reservoir defined by the formation. The polyamide imide coating is generally viscous to solid nature, and depending on molecular weight. Any suitable polyamide imide coating may be used for the purposes of the subject invention. The polyamide imide coating is typically present in the proppant in an amount of from about 0.1 to about 20, more typically of from about 0.5 to about 7.5, and most typically of from about 1.0 to about 6.0, percent by weight based on 100 parts by weight of the particle. Of course, the amount of polyamide imide coating present in the proppant may vary outside of the ranges above, but is typically both whole and fractional values within about 0.1 to about 20 percent by weight, based on 100 parts by weight of the particle.

The polyamide imide coating may be formed in-situ where the polyamide imide coating is disposed on the particle during formation of the polyamide imide coating. Said differently, the components of the polyamide imide coating are typically combined with the particle and the polyamide imide coating is disposed on the particle.

However, in one embodiment a polyamide imide coating is formed and some time later applied to, e.g. mixed with, the particle and exposed to temperatures exceeding 100° C. to coat the particle and form the proppant. Advantageously, this embodiment allows the polyamide imide coating to be formed at a location designed to handle chemicals, under the control of personnel experienced in handling chemicals. Once formed, the polyamide imide coating can be transported to another location, applied to the particle, and heated. There are numerous logistical and practical advantages associated with this embodiment. For example, if the polyamide imide coating is being applied to the particle, e.g. frac sand, the polyamide imide coating may be applied immediately following the manufacturing of the frac sand, when the frac sand is already at elevated temperature, eliminating the need to reheat the polyamide imide coating and the frac sand, thereby reducing the amount of energy required to form the proppant.

In another embodiment, the isocyanate-reactive component, such as trimellitic anhydride, and the isocyanate, such as polymeric isocyanate, are reacted to form the polyamide imide coating in a solution. The solution comprises a solvent such as acetone. The solution viscosity is controlled by stoichiometry, monofunctional reagents, and a polymer solids level. After the polyamide imide is formed in the solution, the solution is applied to the particle. The solvent evaporates leaving the polyamide imide coating disposed on the particle. Once the polyamide imide coating is disposed on the particle to form the proppant, the proppant can be heated to further crosslink the polyamide imide coating. Generally, the crosslinking, which occurs as a result of the heating, optimizes physical properties of the polyamide imide coating.

The polyamide imide coating may also be further defined as controlled-release. That is, the polyamide imide coating may systematically dissolve, hydrolyze in a controlled manner, or physically expose the particle to the petroleum fuels in the subsurface reservoir. The polyamide imide coating typically gradually dissolves in a consistent manner over a predetermined time period to decrease the thickness of the polyamide imide coating. This embodiment is especially useful for applications utilizing the active agent such as the microorganism and/or the catalyst. That is, the polyamide imide coating is typically controlled-release for applications requiring filtration of petroleum fuels or water.

The polyamide imide coating may exhibit excellent non-wettability in the presence of water, as measured in accordance with standard contact angle measurement methods known in the art. The polyamide imide coating may have a contact angle of greater than 90° and may be categorized as hydrophobic. Consequently, the proppant of such an embodiment can partially float in the subsurface reservoir and is typically useful for applications requiring foam coatings.

The polyamide imide coating of the present invention can be crosslinked where it is cured prior to pumping of the proppant into the subsurface reservoir, or the polyamide imide coating can be curable whereby the polyamide imide coating cures in the subsurface reservoir due to the conditions inherent therein. These concepts are described further below.

The proppant of the subject invention may comprise the particle encapsulated with a crosslinked polyamide imide coating. The crosslinked polyamide imide coating typically provides crush strength, or resistance, for the proppant and prevents agglomeration of the proppant. Since the crosslinked polyamide imide coating is cured before the proppant is pumped into a subsurface reservoir, the proppant typically does not crush or agglomerate even under high pressure and temperature conditions.

Alternatively, the proppant of the subject invention may comprise the particle encapsulated with a curable polyamide imide coating. The curable polyamide imide coating typically consolidates and cures subsurface. The curable polyamide imide coating is typically not crosslinked, i.e., cured, or partially crosslinked before the proppant is pumped into the subsurface reservoir. Instead, the curable polyamide imide coating typically cures under the high pressure and temperature conditions in the subsurface reservoir. Proppants comprising the particle encapsulated with the curable polyamide imide coating are often used for high pressure and temperature conditions.

Additionally, proppants comprising the particle encapsulated with the curable polyamide imide coating may be classified as curable proppants, subsurface-curable proppants and partially-curable proppants. Subsurface-curable proppants typically cure entirely in the subsurface reservoir, while partially-curable proppants are typically partially cured before being pumped into the subsurface reservoir. The partially-curable proppants then typically fully cure in the subsurface reservoir. The proppant of the subject invention can be either subsurface-curable or partially-curable.

Multiple layers of the polyamide imide coating can be applied to the particle to form the proppant. As such, the proppant of the subject invention can comprise a particle having a crosslinked polyamide imide coating disposed on the particle and a curable polyamide imide coating disposed on the crosslinked coating, and vice versa. Likewise, multiple layers of the polyamide imide coating, each individual layer having the same or different physical properties, can be applied to the particle to form the proppant. In addition, the polyamide imide coating can be applied to the particle in combination with coatings of different materials such as polyurethane coatings, polycarbodiimide coatings, and other material coatings.

The proppant may further include a silicon-containing adhesion promoter. This adhesion promoter is also commonly referred to in the art as a coupling agent or as a binder agent. The adhesion promoter binds the polyamide imide coating to the particle. More specifically, the adhesion promoter typically has organofunctional silane groups to improve adhesion of the polyamide imide coating to the particle. Without being bound by theory, it is thought that the adhesion promoter allows for covalent bonding between the particle and the polyamide imide coating. In one embodiment, the surface of the particle is activated with the adhesion promoter by applying the adhesion promoter to the particle prior to coating the particle with the polyamide imide coating. In this embodiment, the adhesion promoter can be applied to the particle by a wide variety of application techniques including, but not limited to, spraying, dipping the particles in the polyamide imide coating, etc. In another embodiment, the adhesion promoter may be added to the isocyanate-reactive component. As such, the particle is then simply exposed to the adhesion promoter when the polyamide imide coating is applied to the particle. The adhesion promoter is useful for applications requiring excellent adhesion of the polyamide imide coating to the particle, for example, in applications where the proppant is subjected to shear forces in an aqueous environment. Use of the adhesion promoter provides adhesion of the polyamide imide coating to the particle such that the polyamide imide coating will remain adhered to the surface of the particle even if the proppant, including the polyamide imide coating, the particle, or both, fractures due to closure stress.

Examples of suitable adhesion promoters, which are silicon-containing, include, but are not limited to, glycidoxypropyltrimethoxysilane, aminoethylaminopropyltrimethoxysilane, methacryloxypropyltrimethoxysilane, gamma-aminopropyltriethoxysilane, vinylbenzylaminoethylaminopropyltrimethoxysilane, glycidoxypropylmethyldiethoxysilane, chloropropyltrimethoxysilane, phenyltrimethoxysilane, vinyltriethoxysilane, tetraethoxysilane, methyldimethoxysilane, bis-triethoxysilylpropyldisulfidosilane, bis-triethoxysilylpropyltetrasulfidosilane, phenyltriethoxysilane, aminosilanes, and combinations thereof.

Specific examples of suitable adhesion promoters include, but are not limited to, Silquest™ A1100, Silquest™ A1110, Silquest™ A1120, Silquest™ 1130, Silquest™ A1170, Silquest™ A-189, and Silquest™ Y9669, all commercially available from Momentive Performance Materials of Albany, N.Y. A particularly suitable silicon-containing adhesion promoter is Silquest™ A1100, i.e., gamma-aminopropyltriethoxysilane. The silicon-containing adhesion promoter may be present in the proppant in an amount of from about 0.001 to about 10, typically from about 0.01 to about 5, and more typically from about 0.05 to about 2, percent by weight, based on 100 parts by weight of the proppant. Of course, the amount of silicon-containing adhesion promoter present in the proppant may vary outside of the ranges above, but is typically both whole and fractional values within about 0.001 to about 10 percent by weight, based on 100 parts by weight of the proppant.

The proppant may further include a wetting agent. The wetting agent is also commonly referred to in the art as a surfactant. The proppant may include more than one wetting agent. The wetting agent may include any suitable wetting agent or mixtures of wetting agents know in the art. The wetting agent is employed to increase a surface area contact between the polyamide imide coating and the particle. In a typical embodiment, the wetting agent is added to the isocyanate-reactive component. In another embodiment, the surface of the particle is activated with the wetting agent by applying the wetting agent to the particle prior to coating the particle with the polyamide imide coating.

A suitable wetting agent is BYK® 310, a polyester modified poly-dimethyl-siloxane, commercially available from BYK Additives and Instruments of Wallingford, Conn. The wetting agent may be present in the proppant in an amount of from about 0.001 to about 10, typically from about 0.002 to about 5, and more typically from about 0.004 to about 2, percent by weight, based on 100 parts by weight of the proppant. Of course, the amount of wetting agent present in the proppant may vary outside of the ranges above, but is typically both whole and fractional values within about 0.001 to about 10 percent by weight, based on 100 parts by weight of the proppant.

The polyamide imide coating of this invention may also include the active agent already described above in the context of the particle. In other words, the active agent may be included in the polyamide imide coating independent of the particle. Once again, suitable active agents include, but are not limited to organic compounds, microorganisms, and catalysts. The polyamide imide coating may include other additives, active or otherwise, such as wetting agents, surfactants, and the like.

The proppant of the subject invention typically exhibits excellent thermal stability for high temperature and pressure applications, e.g. temperatures greater than 100° C., typically greater than 250° C., more typically greater than 350° C., and even more typically greater than 500° C., and/or pressures (independent of the temperatures described above) greater than 7,500 psi, typically greater than 10,000 psi, more typically greater than 12,500 psi, and even more typically greater than 15,000 psi. The proppant of this invention does not suffer from complete failure of the polyamide imide coating due to shear or degradation when exposed to such temperatures and pressures.

Further, with the polyamide imide coating of this invention, the proppant typically exhibits excellent crush strength, also commonly referred to as crush resistance. With this crush strength, the polyamide imide coating of the proppant is uniform and is substantially free from defects, such as gaps or indentations, which often contribute to premature breakdown and/or failure of the polyamide imide coating. In particular, the proppant exhibits a crush strength of 15% or less maximum fines as measured in accordance with American Petroleum Institute (API) RP60 at pressures ranging from 7500 to 15000 psi, including at specific stress pressures of 7500, 10000, 12500, and 15000 psi.

When 20/40 Arizona sand is utilized as the particle, a preferred crush strength associated with the proppant of this invention is 10% or less, more preferred 5% or less, maximum fines as measured in accordance with API RP60 at the same stress pressure range and specific stress pressures described above. When 40/70 Ottawa sand is utilized as the particle, a crush strength associated with the proppant of this invention is typically less than 8%, more typically 5%, and most typically 2% maximum fines as measured in accordance with API RP60 at the same stress pressure range and specific stress pressures described above. In one embodiment where 40/70 Ottawa sand is utilized as the particle, the crush strength of this proppant is 1.5% fines as measured in accordance with API RP60 at 7500 psi.

In addition to testing crush strength in accordance with the parameters set forth in API RP60, the crush strength of the proppant can be tested with various other testing parameters. For example, a sample of the proppant can be sieved to a sieve size of greater than 35. Once sieved and tested, the proppant of the present invention typically has a crush strength of 15%, more typically 10%, even more typically 5%, and most typically 2.5%, or less maximum fines less than sieve size 35 as measured by compressing a 9.4 g sample of the proppant in a test cylinder having a diameter of 1.5 inches for 1 hour at 7500 psi and 93° C.

The polyamide imide coating of this invention typically provides a cushioning effect for the proppant and evenly distributes high pressures, e.g. closure stresses, around the proppant. Therefore, the proppant of the subject invention effectively props open fractures and minimizes unwanted impurities in unrefined petroleum fuels in the form of dust particles.

Although customizable according to carrier fluid selection, the proppant typically has a specific gravity of from 0.1 to 3.0, more typically from 1.0 to 2.0. One skilled in the art typically selects the specific gravity of the proppant according to the specific gravity of the carrier fluid and whether it is desired that the proppant be lightweight or substantially neutrally buoyant in the selected carrier fluid. In particular, it is desired that the specific gravity of the proppant is less than the specific gravity of the carrier fluid to minimize proppant settling in the carrier fluid. Further, based on the non-wettability of the polyamide imide coating including crosslinks as set forth above, the proppant of such an embodiment typically has an apparent density, i.e., a mass per unit volume of bulk proppant, also known as bulk density, of from 2.0 to 3.0, more typically from 2.3 to 2.7, $g/cm^3$ according to API Recommended Practices RP60 for testing proppants. It is believed that the non-wettability of the polyamide imide coating may contribute to flotation of the proppant depending on the selection of the carrier fluid in the wellbore.

Further, the proppant typically minimizes unpredictable consolidation. That is, the proppant only consolidates, if at all, in a predictable, desired manner according to carrier fluid selection and operating temperatures and pressures. Also, the proppant is typically compatible with low-viscosity carrier fluids having viscosities of less than about 3,000 cps at 80° C. and is typically substantially free from mechanical failure and/or chemical degradation when exposed to the carrier fluids and high pressures. Finally, the proppant is typically coated via economical coating processes and typically does not require multiple coating layers, and therefore minimizes production costs.

As set forth above, the subject invention also provides the method of forming, or preparing, the proppant. For this method, the particle and the polyamide imide coating are provided, and the particle is coated with the polyamide imide coating. The step of coating the particle with the polyamide imide coating is described additionally below.

To provide the polyamide imide coating, the isocyanate is reacted with the isocyanate-reactive component. As indicated in certain embodiments below, the isocyanate may be reacted to form the polyamide imide coating prior to the actual coating of the particle; alternatively, the isocyanate may be reacted to form the polyamide imide coating simultaneous with the actual coating of the particle.

As with all other components which may be used in the method of the subject invention (e.g. the particle), the isocyanate and the isocyanate reactive component are just as described above with respect to the polyamide imide coating.

The particle is coated with the polyamide imide coating to form the proppant. The polyamide imide coating is applied to the particle to coat the particle. The particle may optionally be heated to a temperature greater than 150° C. prior to or simultaneous with the step of coating the particle with the polyamide imide coating. A preferred temperature range for heating the particle is 150-180° C. Heating the particle brings the temperature of the particle closer to a temperature at which the components can react to form the polyamide imide coating or further cross-link the polyamide imide coating.

Various techniques can be used to coat the particle with the polyamide imide coating. These techniques include, but are not limited to, mixing, pan coating, fluidized-bed coating, co-extrusion, spraying, in-situ formation of the coating, and spinning disk encapsulation. The technique for applying the coating to the particle is selected according to cost, production efficiencies, and batch size.

In this method, the step of reacting the isocyanate in the presence of the catalyst to form the polyamide imide coating and the step of coating the particle with the polyamide imide coating are collectively conducted in 20 minutes or less, typically in 15 minutes or less, and more typically in 1 to 10 minutes.

Once coated, the proppant can be heated to further crosslink the polyamide imide coating. Generally, the crosslinking, which occurs as a result of the heating, optimizes physical properties of the proppant, thereby optimizing the performance of the proppant. When the proppant is heated to further crosslink the polyamide imide coating, the proppant is typically heated to a temperature of from about 50 to about 500, more typically from about 100 to about 400, and most typically from about 150 to about 350° C. for any amount of time. In one embodiment, the proppant is heated to a temperature of about 265° C. for 1.25 hours. Where the proppant is heated to further crosslink the polyamide imide coating, the step of reacting the isocyanate to form the polyamide imide coating, the step of coating the particle with the polyamide imide coating, and of the step of heating the proppant to further crosslink the polyamide imide coating may be collectively conducted in 10 hours or less, typically in 1.5 hours or less, more typically in 1 hour or less, and most typically in 0.5 hours or less.

In one embodiment, the polyamide imide coating is disposed on the particle via mixing in a vessel, e.g. a reactor. In particular, the individual components of the proppant, e.g. the isocyanate, the isocyanate-reactive component, and the particle, are added to the vessel to form a reaction mixture. The components may be added in equal or unequal weight ratios. The reaction mixture is typically agitated at an agitator speed commensurate with the viscosities of the components. Further, the reaction mixture is typically heated at a temperature commensurate with the polyamide imide coating technology and batch size. For example, the components of the polyamide imide coating are typically heated from a temperature of about 70° C. to a temperature of about 130° C. in 10 minutes or less, depending on batch size. It is to be appreciated that the technique of mixing may include adding components to the vessel sequentially or concurrently. Also, the components may be added to the vessel at various time intervals and/or temperatures.

In another embodiment, the polyamide imide coating is disposed on the particle via spraying. In particular, individual components of the polyamide imide coating are contacted in a spray device to form a coating mixture. The coating mixture is then sprayed onto the particle to form the proppant. Spraying the polyamide imide coating onto the particle results in a uniform, complete, and defect-free polyamide imide coating disposed on the particle. For example, the polyamide imide coating is typically even and unbroken. The polyamide imide coating also typically has adequate thickness and acceptable integrity, which allows for applications requiring controlled-release of the proppant in the fracture. Spraying also typically results in a thinner and more consistent polyamide imide coating disposed on the particle as compared to other techniques, and thus the proppant is coated economically. Spraying the particle even permits a continuous manufacturing process. Spray temperature is typically selected by one known in the art according to polyamide imide coating technology and ambient humidity conditions. The particle may also be heated to induce crosslinking of the polyamide imide coating. Further, one skilled in the art typically sprays the components of the polyamide imide coating at a viscosity commensurate with the viscosity of the components.

In another embodiment, the polyamide imide coating is disposed on the particle in-situ, i.e., in a reaction mixture comprising the components of the polyamide imide coating and the particle. In this embodiment, the polyamide imide coating is formed or partially formed as the polyamide imide coating is disposed on the particle. In-situ polyamide imide coating formation steps typically include providing each component of the polyamide imide coating, providing the particle, combining the components of the polyamide imide coating and the particle, and disposing the polyamide imide coating on the particle. In-situ formation of the polyamide imide coating typically allows for reduced production costs by way of fewer processing steps as compared to existing methods for forming a proppant.

The formed proppant is typically prepared according to the method as set forth above and stored in an offsite location before being pumped into the subterranean formation and the subsurface reservoir. As such, spraying typically occurs offsite from the subterranean formation and subsurface reservoir. However, it is to be appreciated that the proppant may also be prepared just prior to being pumped into the subterranean formation and the subsurface reservoir. In this scenario, the proppant may be prepared with a portable coating apparatus at an onsite location of the subterranean formation and subsurface reservoir.

The proppant is useful for hydraulic fracturing of the subterranean formation to enhance recovery of petroleum and the like. In a typical hydraulic fracturing operation, a hydraulic fracturing composition, i.e., a mixture, comprising the carrier fluid, the proppant, and optionally various other components, is prepared. The carrier fluid is selected according to wellbore conditions and is mixed with the proppant to form the mixture which is the hydraulic fracturing composition. The carrier fluid can be a wide variety of fluids including, but not limited to, kerosene and water. Typically, the carrier fluid is water. Various other components which can be added to the mixture include, but are not limited to, guar, polysaccharides, and other components know to those skilled in the art.

The mixture is pumped into the subsurface reservoir, which may be the wellbore, to cause the subterranean formation to fracture. More specifically, hydraulic pressure is applied to introduce the hydraulic fracturing composition under pressure into the subsurface reservoir to create or enlarge fractures in the subterranean formation. When the hydraulic pressure is released, the proppant holds the fractures open, thereby enhancing the ability of the fractures to extract petroleum fuels or other fluids from the subsurface reservoir to the wellbore.

For the method of filtering a fluid, the proppant of the subject invention is provided according to the method of forming the proppant as set forth above. In one embodiment, the fluid can be an unrefined petroleum or the like. However, it is to be appreciated that the method of the subject invention may include the filtering of other fluids not specifically recited herein, for example, air, water, or natural gas.

To filter the fluid, the fracture in the subsurface reservoir that contains the unrefined petroleum, e.g. unfiltered crude oil, is identified by methods known in the art of oil extraction. Unrefined petroleum is typically procured via a subsurface reservoir, such as a wellbore, and provided as feedstock to refineries for production of refined products such as petroleum gas, naphtha, gasoline, kerosene, gas oil, lubricating oil, heavy gas, and coke. However, crude oil that resides in subsurface reservoirs includes impurities such as sulfur, undesirable metal ions, tar, and high molecular weight hydrocarbons. Such impurities foul refinery equipment and lengthen refinery production cycles, and it is desirable to minimize such impurities to prevent breakdown of refinery equipment, minimize downtime of refinery equipment for maintenance and cleaning, and maximize efficiency of refinery processes. Therefore, filtering is desirable.

For the method of filtering, the hydraulic fracturing composition is pumped into the subsurface reservoir so that the hydraulic fracturing composition contacts the unfiltered crude oil. The hydraulic fracturing composition is typically pumped into the subsurface reservoir at a rate and pressure such that one or more fractures are formed in the subterranean formation. The pressure inside the fracture in the subterranean formation may be greater than 5,000, greater than 7,000, or even greater than 10,000 psi, and the temperature inside the fracture is typically greater than 70° F. and can be as high 375° F. depending on the particular subterranean formation and/or subsurface reservoir.

Although not required for filtering, it is particularly desirable that the proppant be a controlled-release proppant. With a controlled-release proppant, while the hydraulic fracturing composition is inside the fracture, the polyamide imide coating of the proppant typically dissolves in a controlled manner due to pressure, temperature, pH change, and/or dissolution in the carrier fluid in a controlled manner, i.e., a controlled-release. Complete dissolution of the polyamide imide coating depends on the thickness of the polyamide imide coating and the temperature and pressure inside the fracture, but typically occurs within 1 to 4 hours. It is to be understood that the terminology "complete dissolution" generally means that less than 1% of the coating remains disposed on or about the particle. The controlled-release allows a delayed exposure of the particle to crude oil in the fracture. In the embodiment where the particle includes the active agent, such as the microorganism or catalyst, the particle typically has reactive sites that must contact the fluid, e.g. the crude oil, in a controlled manner to filter or otherwise clean the fluid. If implemented, the controlled-release provides a gradual exposure of the reactive sites to the crude oil to protect the active sites from saturation. Similarly, the active agent is typically sensitive to immediate contact with free oxygen. The controlled-release provides the gradual exposure of the active agent to the crude oil to protect the active agent from saturation by free oxygen, especially when the active agent is a microorganism or catalyst.

To filter the fluid, the particle, which is substantially free of the polyamide imide coating after the controlled-release, contacts the fluid, e.g. the crude oil. It is to be understood that the terminology "substantially free" means that complete dissolution of the polyamide imide coating has occurred and, as defined above, less than 1% of the polyamide imide coating remains disposed on or about the particle. This terminology is commonly used interchangeably with the terminology "complete dissolution" as described above. In an embodiment where an active agent is utilized, upon contact with the fluid, the particle typically filters impurities such as sulfur, unwanted metal ions, tar, and high molecular weight hydrocarbons from the crude oil through biological digestion. As noted above, a combination of sands/sintered ceramic particles and microorganisms/catalysts are particularly useful for filtering crude oil to provide adequate support/propping and also to filter, i.e., to remove impurities. The proppant therefore typically filters crude oil by allowing the delayed exposure of the particle to the crude oil in the fracture.

The filtered crude oil is typically extracted from the subsurface reservoir via the fracture, or fractures, in the subterranean formation through methods known in the art of oil extraction. The filtered crude oil is typically provided to oil refineries as feedstock, and the particle typically remains in the fracture.

Alternatively, in a fracture that is nearing its end-of-life, e.g. a fracture that contains crude oil that cannot be economically extracted by current oil extraction methods, the particle may also be used to extract natural gas as the fluid from the fracture. The particle, particularly where an active agent is utilized, digests hydrocarbons by contacting the reactive sites of the particle and/or of the active agent with the fluid to convert the hydrocarbons in the fluid into propane or methane. The propane or methane is then typically harvested from the fracture in the subsurface reservoir through methods known in the art of natural gas extraction.

The following examples are meant to illustrate the invention and are not to be viewed in any way as limiting to the scope of the invention.

EXAMPLES

Examples 1-5 are proppants formed according to the subject invention comprising the polyamide imide coating disposed on the particle. Examples 1-5 are formed with components disclosed in Table 1. The amounts in Table 1 are in parts by weight, based on 100 parts by weight of the proppant.

TABLE 1

| Component | Example 1 | Example 2 | Example 3 | Example 4 | Example 5 |
|---|---|---|---|---|---|
| Carboxylic Acid Anhydride | 0.907 | 0.907 | 0.955 | 0.955 | 0.963 |

TABLE 1-continued

| Component | Example 1 | Example 2 | Example 3 | Example 4 | Example 5 |
|---|---|---|---|---|---|
| Amine A | 0.160 | 0.160 | — | — | — |
| Amine B | — | — | 0.072 | 0.072 | — |
| Amine C | — | — | — | — | 0.073 |
| Catalyst | 0.008 | 0.008 | 0.008 | 0.008 | 0.010 |
| Isocyanate | 1.429 | 1.429 | 1.469 | 1.469 | 1.460 |
| Adhesion Promoter | 0.150 | 0.150 | 0.150 | 0.150 | 0.150 |
| Wetting Agent | 0.006 | 0.006 | 0.006 | 0.006 | 0.010 |
| Particle | 97.340 | 97.340 | 97.340 | 97.340 | 97.334 |
| Total | 100.000 | 100.000 | 100.000 | 100.000 | 100.000 |

Carboxylic Acid Anhydride is trimellitic anhydride.
Amine A is gamma-aminopropyltriethoxysilane.
Amine B is N-beta-(aminoethyl)-gamma-aminopropyltrimethoxysilane.
Amine C is polyoxypropylenediamine.
Catalyst is triethylamine.
Isocyanate is a polymeric polymeric diphenylmethane diisocyanate.
Adhesion Promoter is gamma-aminopropyltriethoxysilane.
Wetting Agent is polyester modified poly-dimethyl-siloxane.
Particle is Ottawa sand having a sieve size of 20/40.

Prior to forming Examples 1-5, the Particle is activated with the Adhesion Promoter. The Particle, now activated, is added to a reaction vessel. The Carboxylic Acid Anhydride, the Catalyst, the Wetting Agent, and Amine A, B, and/or C, depending on the Example, and the Isocyanate are dissolved in acetone to form a solution. The solution is sprayed applied onto the Particle in the reaction vessel to form a reaction mixture. The reaction mixture, at 265° C., is agitated to (1) uniformly coat the surface of, or wet out, the Particle with the reaction mixture and (2) polymerize the Carboxylic Acid Anhydride and the Isocyanate. Agitation continues for about 10 minutes. As such, Examples 1-5 are proppants comprising the Particle and the polyamide imide coating formed thereon. The proppants of Examples 1-5 are heated, i.e., post-cured to further cure the polyamide imide coating. Examples 1-5 are post-cured according to the parameters set forth below in Table 2.

TABLE 2

| Post-Cure Parameter | Example 1 | Example 2 | Example 3 | Example 4 | Example 5 |
|---|---|---|---|---|---|
| Temperature (° C.) | 265 | 270 | 265 | 270 | 265 |
| Time (hours) | 1 | 3 | 1.25 | 3 | 1 |

Examples 1-5 are tested for crush strength, the test results are set forth in Table 3 below. The appropriate formula for determining percent fines is set forth in API RP60. Prior to testing crush strength, Examples 1-5 are sieved to ensure that a proppant sample comprises individual proppant particles which are greater than sieve size 35. The crush strength of Examples 1-5 is tested by compressing a proppant sample (sieved to>sieve size 35), which weighs 9.4 grams, in a test cylinder (having a diameter of 1.5 inches as specified in API RP60) for 1 hour at 7500 psi and 93° C. (approximately 200° F.). After compression, percent fines and agglomeration are determined.

Agglomeration is an objective observation of a proppant sample, i.e., a particular Example, after crush strength testing as described above. The proppant sample is assigned a numerical ranking between 1 and 10. If the proppant sample agglomerates completely, it is ranked 10. If the proppant sample does not agglomerate, i.e., it falls out of the cylinder after crush test, it is rated 1.

TABLE 3

| | Example 1 | Example 2 | Example 3 | Example 4 | Example 5 |
|---|---|---|---|---|---|
| % Fines (<100 sieve size) | 0.9 | 0.7 | 0.3 | 0.3 | 0.7 |
| % Fines (<40 sieve size) | 4.5 | 5.3 | 1.9 | 3.4 | 4.4 |
| % Fines (<35 sieve size) | 7.1 | 9.7 | 4.1 | 6.1 | 7.7 |
| Agglomeration | 1 | 1 | 1 | 1 | 1 |

Referring now to Table 3, Examples 1-5 demonstrate excellent crush strength and agglomeration.

In addition, Example 3 is tested for conductivity and permeability in accordance with PS-50™ fracture conductivity test, the test results are set forth in Table 4 below. International Standards Organization, ISO procedures 13503-5 "Procedures for measuring the long term conductivity of proppants" are used to obtain baseline values. Conductivity and permeability testing is performed at 250° F. and a stress level of 6,000-psi.

TABLE 4

| | Stress (psi) | Conductivity (mDft) | Permeability (Darcy) |
|---|---|---|---|
| Example 3 | 1,000 24 hrs. | 4767 | 223 |
| | 6,000 initial | 2694 | 134 |
| | 6,000 final | 1488 | 76 |

Generally, the higher the conductivity and the permeability, the better. Referring now to Table 3, Example 3 demonstrates excellent conductivity and permeability.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described in an illustrative manner, and it is to be understood that the terminology which has been used is intended to be in the nature of words of description rather than of limitation. Obviously, many modifications and variations of the present invention are possible in light of the above teachings. It is, therefore, to be understood that within the scope of the appended claims, the present invention may be practiced otherwise than as specifically described.

What is claimed is:

1. A proppant for hydraulically fracturing a subterranean formation, said proppant comprising:
   A. a particle; and
   B. a polyamide imide coating disposed on said particle in an amount of from about 0.5 to about 7.5 percent by weight, based on 100 parts by weight of said particle.

2. The proppant as set forth in claim 1 wherein said particle is selected from the group of minerals, ceramics, sands, nut shells, gravels, mine tailings, coal ashes, rocks, smelter slag, diatomaceous earth, crushed charcoals, micas, sawdust, wood chips, resinous particles, polymeric particles, and combinations thereof.

3. The proppant as set forth in claim 1 wherein said polyamide imide coating is present in said proppant in an amount of from about 1.0 to about 6.0 percent by weight, based on 100 parts by weight of said particle.

4. The proppant as set forth in claim 1 that is thermally stable at temperatures greater than 100° C.

5. The proppant as set forth in claim 1 having a crush strength of 15% or less maximum fines less than sieve size 35 as measured by compressing a 9.4 g sample of said proppant in a test cylinder having a diameter of 1.5 inches for 1 hour at 7500 psi and 93° C.

6. The proppant as set forth in claim 1 wherein said polyamide imide coating comprises the reaction product of an isocyanate and an isocyanate-reactive component.

7. The proppant as set forth in claim 6 wherein said isocyanate comprises polymeric diphenylmethane diisocyanate and has an isocyanate (NCO) content of about 31.5 weight percent.

8. The proppant as set forth in claim 6 wherein said isocyanate and said isocyanate-reactive component react in the presence of a catalyst to form said polyamide imide coating.

9. The proppant as set forth in claim 8 wherein said catalyst is triethylamine.

10. The proppant as set forth in claim 8 wherein said isocyanate is reacted, to form said polyamide imide coating, in an amount of from about 0.01 to about 14 parts by weight, based on 100 parts by weight of said proppant.

11. The proppant as set forth in claim 6 wherein said isocyanate-reactive component is further defined as the reaction product of a carboxylic acid anhydride and an amine.

12. The proppant as set forth in claim 11 wherein said carboxylic acid anhydride comprises an aromatic carboxylic acid anhydride.

13. The proppant as set forth in claim 11 wherein said amine is selected from the group of polyether amines, amino silanes, and combinations thereof.

14. The proppant as set forth in claim 11 wherein said amine is reacted, to form said polyamide imide coating, in an amount of from about 0.001 to about 5 parts by weight, based on 100 parts by weight of said proppant.

15. The proppant as set forth in claim 6 wherein said isocyanate-reactive component comprises a carboxylic acid anhydride.

16. The proppant as set forth in claim 15 wherein said carboxylic acid anhydride is trimellitic anhydride.

17. The proppant as set forth in claim 15 wherein said carboxylic acid anhydride is reacted, to form said polyamide imide coating, in an amount of from about 0.06 to about 14 parts by weight, based on 100 parts by weight of said proppant.

18. A method of forming a proppant for hydraulically fracturing a subterranean formation, said method comprising the steps of:
   A. providing a particle;
   B. providing a polyamide imide coating; and
   C. coating the particle with the polyamide imide coating particle in an amount of from about 0.5 to about 7.5 percent by weight, based on 100 parts by weight of the particle.

19. The method as set forth in claim 18 further comprising the step of heating the particle to a temperature greater than 150° C. prior to or simultaneous with the step of coating the particle with the polyamide imide coating.

20. The method as set forth in claim 18 further comprising the step of heating the proppant to further crosslink the polyamide imide coating.

21. The method as set forth in claim 18 further comprising the step of reacting an isocyanate and an isocyanate-reactive component to form the polyamide imide coating.

22. The method as set forth in claim 21 wherein the steps of reacting the isocyanate-reactive component and the isocyanate to form the polyamide imide coating and of coating the particle with the polyamide imide coating are collectively conducted in 20 minutes or less.

23. The method as set forth in claim 21 wherein the step of reacting the isocyanate-reactive component and the isocyanate to form the polyamide imide coating is conducted prior to the step of coating the particle with the polyamide imide coating.

24. The method as set forth in claim 21 wherein the isocyanate-reactive component comprises a carboxylic acid anhydride.

25. The method as set forth in claim 21 further comprising the step of reacting a carboxylic acid anhydride and an amine to form the isocyanate-reactive component.

26. The method as set forth in claim 21 wherein the step of reacting the isocyanate-reactive component and the isocyanate to form the polyamide imide coating is conducted simultaneous with the step of coating the particle with the polyamide imide coating.

27. The method as set forth in claim 26 further comprising the step of heating the proppant to further crosslink the polyamide imide coating.

28. The method as set forth in claim 27 wherein the steps of reacting the isocyanate-reactive component and the isocyanate to form the polyamide imide coating, of coating the particle with the polyamide imide coating, and of heating the proppant to further crosslink the polyamide imide coating are collectively conducted in 1.5 hours or less.

29. A method of hydraulically fracturing a subterranean formation which defines a subsurface reservoir with a mixture comprising a carrier fluid and a proppant, the proppant comprising a particle and a polyamide imide coating disposed on the particle in an amount of from about 0.5 to about 7.5 percent by weight, based on 100 parts by weight of said particle, said method comprising the step of pumping the mixture into the subsurface reservoir to cause the subterranean formation to fracture.

30. The method as set forth in claim 29 wherein the polyamide imide coating comprises the reaction product of an isocyanate comprising polymeric diphenylmethane diisocyanate and an isocyanate-reactive component comprising trimellitic anhydride.

\* \* \* \* \*